United States Patent
Li et al.

(10) Patent No.: US 10,911,989 B2
(45) Date of Patent: Feb. 2, 2021

(54) METHOD FOR KEEPING IN CIRCUIT SWITCHED FALLBACK CSFB NETWORK AND USER TERMINAL

(71) Applicant: HUAWEI TECHNOLOGIES CO., LTD., Guangdong (CN)

(72) Inventors: Zhongjin Li, Xi'an (CN); Lei Li, Xi'an (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/066,539

(22) PCT Filed: Dec. 29, 2015

(86) PCT No.: PCT/CN2015/099326
§ 371 (c)(1),
(2) Date: Jun. 27, 2018

(87) PCT Pub. No.: WO2017/113079
PCT Pub. Date: Jul. 6, 2017

(65) Prior Publication Data
US 2020/0275322 A1    Aug. 27, 2020

(51) Int. Cl.
*H04W 36/00*    (2009.01)
*H04W 76/18*    (2018.01)
(Continued)

(52) U.S. Cl.
CPC ..... *H04W 36/0022* (2013.01); *H04L 65/1016* (2013.01); *H04L 65/1069* (2013.01); *H04W 36/14* (2013.01); *H04W 76/18* (2018.02)

(58) Field of Classification Search
CPC . H04W 36/0022; H04W 36/14; H04W 76/18; H04L 65/1016; H04L 65/1069
(Continued)

(56) References Cited

U.S. PATENT DOCUMENTS

2010/0316034 A1* 12/2010 Burbidge .............. H04W 36/14
370/338
2010/0317348 A1* 12/2010 Burbidge .......... H04W 36/0066
455/436
(Continued)

FOREIGN PATENT DOCUMENTS

| CN | 103002531 A | 3/2013 |
| CN | 104080134 A | 10/2014 |
| CN | 104365152 A | 2/2015 |

OTHER PUBLICATIONS

International Search Report and Written Opinion issued in International Application No. PCT/CN2015/099326 dated Sep. 29, 2016, 11 pages.

*Primary Examiner* — Mong-Thuy T Tran
(74) *Attorney, Agent, or Firm* — Fish & Richardson P.C.

(57) ABSTRACT

Embodiments of the present disclosure include methods for keeping in a CSFB network and an example user terminal, wherein when a first call of a 4G user fails to be set up, the user terminal keeps in a target network accessed by circuit switched fallback (CSFB). In this way, when the 4G user receives a call request message for the second time, the user terminal does not need to perform CSFB, thereby increasing a call setup success rate. One example method includes obtaining, by a user terminal, a first call request message. The user terminal performs CSFB according to the first call request message to access a target network. The user terminal determines whether a call setup message is received. If no call setup message is received, the user terminal camps on the target network.

8 Claims, 5 Drawing Sheets

(51) Int. Cl.
*H04L 29/06* (2006.01)
*H04W 36/14* (2009.01)

(58) Field of Classification Search
USPC .......................................... 455/436
See application file for complete search history.

(56) References Cited

U.S. PATENT DOCUMENTS

| | | | |
|---|---|---|---|
| 2012/0122459 A1* | 5/2012 | Wu | H04W 36/0022 455/437 |
| 2013/0070728 A1* | 3/2013 | Umatt | H04W 36/0022 370/331 |
| 2013/0195009 A1* | 8/2013 | Ramle | H04W 40/34 370/328 |
| 2013/0329567 A1 | 12/2013 | Mathias et al. | |
| 2014/0113636 A1* | 4/2014 | Lee | H04W 76/16 455/437 |
| 2014/0177592 A1 | 6/2014 | Li et al. | |
| 2014/0177599 A1* | 6/2014 | Tao | H04W 36/0022 370/331 |
| 2014/0247730 A1* | 9/2014 | Thota | H04W 36/14 370/252 |
| 2015/0146685 A1* | 5/2015 | Han | H04W 36/0022 370/331 |
| 2016/0007240 A1* | 1/2016 | Belghoul | H04W 36/0022 370/331 |
| 2016/0073317 A1* | 3/2016 | Khay-Ibbat | H04N 7/147 348/14.02 |
| 2016/0338009 A1* | 11/2016 | Yang | H04W 68/005 |
| 2017/0245311 A1* | 8/2017 | Murray | H04W 40/22 |

* cited by examiner

METHOD FOR KEEPING IN CIRCUIT SWITCHED FALLBACK CSFB NETWORK AND USER TERMINAL

CROSS-REFERENCE TO RELATED APPLICATIONS

This application is a national stage of International Application No. PCT/CN2015/099326, filed Dec. 29, 2015, which is hereby incorporated by reference in its entirety.

TECHNICAL FIELD

The present invention relates to the field of communications technologies, and specifically, to a method for keeping in a CSFB network and a user terminal.

BACKGROUND

In a current communication environment in which a 2G network and a 3G network coexist with a 4G network, a mainstream voice solution in the 4G network is circuit switched fallback (Circuit Switched Fallback, CSFB). That is, when a 4G user is dialing as a calling party or receives a paging message as a called party, a 4G user terminal falls back to the 2G network or the 3G network from the 4G network to perform a voice service, and then performs fast return (Fast Return, FR) to access the 4G network after the voice service ends.

In the prior art, a main reason that a called party cannot be connected in the 4G network is as follows.

Currently, the 4G network is at a developing stage, the network is not well deployed, and network boundary problems are common. This results in an information sharing problem of different location areas of the 4G network and the 2G network or the 3G network. Therefore, after a 4G user terminal falls back to the 2G network or the 3G network from the 4G network, and successfully performs a location area update (Location area update, LAU), a CSFB process consumes too much time, and this causes a paging timeout. Consequently, the 2G network or the 3G network does not send a message such as a setup message to the 4G user terminal, thereby causing a call error.

The user terminal cannot receive a message such as a setup message. In this case, the user terminal performs FR to access the 4G network. However, according to a user behavior analysis, when a first call is not connected, a second call is usually made afterward. When the 4G user is dialing as a calling party or receives a paging message as a called party for the second time, the abnormal case at the first time may still occur. Consecutive disconnected calls cause extremely poor user experience.

SUMMARY

Embodiments of the present invention provide a method for keeping in a CSFB network and a user terminal, so that when a first call of a 4G user fails to be set up, the user terminal keeps in a target network accessed by means of CSFB. In this way, when receiving a call request for the second time, the user terminal does not need to perform CSFB, thereby increasing a call setup success rate.

A first aspect of the present invention provides a method for keeping in a circuit switched fallback CSFB network, including:

obtaining, by a user terminal, a first call request message;

performing, by the user terminal, CSFB according to the first call request message to access a target network;

determining, by the user terminal, whether a call setup message is received; and if no call setup message is received, camping, by the user terminal, on the target network.

When a user, as a calling party, needs to initiate a circuit switched service such as a call, the user terminal may receive a first call request message. Specifically, the user may initiate a call to a called party by using a dialing interface of the user terminal. Alternatively, when a user, as a called party, receives paging initiated by a calling party, the user terminal may receive a first call request message delivered by the calling party by using a 4G network.

If the user terminal is currently in the 4G network, because the 4G network does not have a circuit switched service, the user terminal needs to perform circuit switched fallback, that is, CSFB, according to the first call request message to access the target network that has the circuit switched service such as a 2G network or a 3G network, so as to perform the circuit switched service.

After accessing the target network, the user terminal may initiate a call to a peer. In addition, the user terminal further needs to monitor whether a call setup message is received. Specifically, by enabling a timer or in another manner, the user terminal may determine whether a call setup message is received within a preset time period. If no call setup message is received, it indicates that a current call fails. Usually, the user initiates a call again. To reduce a quantity of network handovers, the user terminal may continue to camp on the target network, so as to wait for the user to initiate a call again.

When obtaining a second call request message, the user terminal has accessed the target network. Therefore, the user terminal does not need to perform a CSFB operation, so as to reduce time consumed in a CSFB process, and avoid a call error caused by a paging timeout, thereby increasing a call setup success rate.

With reference to the first aspect of the present invention, in a first implementation of the first aspect of the present invention, after the camping, by the user terminal, on the target network, the method further includes:

determining, by the user terminal, whether a preset FR condition is met; and if the user terminal receives a second call request message before meeting the preset FR condition, performing, by the user terminal, a call operation in the target network; or if the user terminal does not receive a second call request message before meeting the preset FR condition, performing, by the user terminal, FR to access a 4G network.

After the user terminal fails in the first call, and camps on the target network, the user usually makes a second call. The user terminal determines whether the preset FR condition is met. If the second call request message is received before the preset FR condition is met, CSFB does not need to be performed because the user terminal is in the target network. In addition, the paging timeout caused by the extremely time-consuming CSFB does not exist. The user terminal can receive the call setup message. The user makes a selection on a call notification interface of the user terminal. The user terminal performs a call operation. If the user terminal does not receive the second call request message before meeting the preset FR condition, the user terminal performs FR to access the 4G network.

With reference to the first implementation of the first aspect of the present invention, in a second implementation of the first aspect of the present invention, the preset FR condition is a preset time period; and the determining, by the user terminal, whether a preset FR condition is met includes:

detecting, by the user terminal, an idle access time since the user terminal accesses the target network, where the idle access time is a time period during which the user terminal does not make a call or receive a call; and determining, by the user terminal, whether the idle access time reaches the preset time period; where if the idle access time reaches the preset time period, the preset FR condition is met; or if the idle access time does not reach the preset time period, the preset FR condition is not met.

Timing starts after the user terminal accesses the target network and when the user terminal does not make a call or receive a call. When the second call request message is not received within the preset time period, it indicates that the user terminal meets the preset FR condition. When the idle access time does not reach the preset time period, that is, the second call request message is received within the preset time period, it indicates that the user terminal does not meet the preset FR condition.

With reference to the first aspect of the present invention, in a third implementation of the first aspect of the present invention, after the camping, by the user terminal, on the target network, the method further includes:

obtaining, by the user terminal, an inter-RAT reselection instruction generated by a user operation, where the inter-RAT reselection instruction is an FR instruction or a hold instruction, the FR instruction is used to instruct the user terminal to access a 4G network, and the hold instruction is used to instruct the user terminal to camp on the target network;

determining, by the user terminal, whether the inter-RAT reselection instruction is the FR instruction; and if the inter-RAT reselection instruction is the FR instruction, performing, by the user terminal, FR to access the 4G network; or if the inter-RAT reselection instruction is not the FR instruction, camping, by the user terminal, on the target network.

After accessing the target network, the user terminal may further show the user an FR operation interface. The FR operation interface has two icons: one is corresponding to the FR instruction, and the other is corresponding to the hold instruction. If the icon selected by the user is corresponding to the FR instruction, the user terminal performs an FR operation. If the icon selected by the user is corresponding to the hold instruction, the user terminal camps on the target network.

With reference to the first aspect of the present invention, the first implementation of the first aspect, the second implementation of the first aspect, or the third implementation of the first aspect, in a fourth implementation of the first aspect of the present invention, the performing, by the user terminal, CSFB according to the first call request message to access a target network includes:

sending, by the user terminal, a CSFB request to the 4G network according to the first call request, so that the 4G network delivers a target frequency channel number of the target network to the user terminal according to the CSFB request;

receiving, by the user terminal, the target frequency channel number; and accessing, by the user terminal, the target network according to the target frequency channel number.

The user terminal is currently in the 4G network, and the first call request obtained by the user terminal is a request for a circuit switched service. Therefore, the user terminal needs to perform CSFB to access the target network in which the circuit switched service can be performed. The user terminal sends the CSFB request to the 4G network. A network device of the 4G network delivers the target frequency channel number of the target network to the user terminal according to the CSFB request. The user terminal disconnects from the 4G network according to the target frequency channel number delivered by the 4G network, and accesses the target network. Elaboration of a CSFB process is for the following purpose: When needing to perform the circuit switched service, the user terminal disconnects from the 4G network in which the circuit switched service cannot be performed, so as to access the target network in which the circuit switched service can be performed.

With reference to the fourth implementation of the first aspect of the present invention, in a fifth implementation of the first aspect of the present invention, after the accessing, by the user terminal, the target network according to the target frequency channel number, the method further includes:

obtaining, by the user terminal, a location area of the target frequency channel number according to the target frequency channel number, and obtaining a location area of the 4G network;

determining, by the user terminal, whether the location area of the target frequency channel number is the same as the location area of the 4G network; and if the location area of the target frequency channel number is the same as the location area of the 4G network, detecting, by the user terminal, a call setup message; or if the location area of the target frequency channel number is not the same as the location area of the 4G network, performing, by the user terminal, an LAU operation on the target frequency channel number.

After accessing the target network according to the target frequency channel number, the user terminal further needs to determine whether the location area of the target frequency channel number is consistent with the location area of the 4G network when the user terminal is in the 4G network. Determining that the two location areas are consistent is to ensure that a call connection can be accurately implemented by using a network device of the location area. If the location area of the target frequency channel number is the same as the location area of the 4G network, the user terminal monitors whether a call setup message is received. If the location area of the target frequency channel number is not the same as the location area of the 4G network, the user terminal performs an LAU operation on the target frequency channel number, and updates the location area of the target frequency channel number to the location area of the 4G network. Performing the LAU operation is to successfully set up a call connection.

A second aspect of the present invention provides a user terminal, including:

an obtaining module, configured to obtain a first call request message;

a processing module, configured to perform CSFB according to the first call request message to access a target network;

a call determining module, configured to determine whether a call setup message is received; and an execution module, configured to: when the call setup message is not received, camp on the target network.

When a user, as a calling party, needs to initiate a voice service such as a call, the obtaining module may receive the first call request message. Specifically, the user may initiate a call to a called party by using a dialing interface of the user terminal. Alternatively, when a user, as a called party, receives paging initiated by a calling party, the obtaining module may receive a first call request message delivered by the calling party by using a 4G network.

If the user terminal is currently in the 4G network, because the 4G network does not have a circuit switched service, the processing module needs to perform circuit switched fallback, that is, CSFB, according to the first call request message to fall back to the target network that has the circuit switched service such as a 2G network or a 3G network, so as to perform the circuit switched service such as a call.

After accessing the target network, the processing module may initiate a call to a peer. In addition, the call determining module further needs to monitor whether a call setup message is received. Specifically, by enabling a timer or in another manner, the user terminal may determine whether a call setup message is received within a preset time period. If no call setup message is received, it indicates that a current call fails. Usually, the user initiates a call again. To reduce a quantity of network handovers, the user terminal may continue to camp on the target network, so as to wait for the user to initiate a call again.

When the obtaining module obtains a second call request message, the processing module has accessed the target network. Therefore, the processing module does not need to perform a CSFB operation, so as to reduce time consumed in a CSFB process, and avoid a call error caused by a paging timeout, thereby increasing a call setup success rate.

With reference to the second aspect of the present invention, in a first implementation of the second aspect of the present invention, the user terminal further includes: a call module and an FR module;

the call determining module is further configured to determine whether a preset FR condition is met;

the call module is configured to: when a second call request message is received before the preset FR condition is met, perform a call operation in the target network; and the FR module is configured to: when the second call request message is not received before the preset FR condition is met, perform FR to access a 4G network.

After the user terminal fails in the first call, and the execution module makes the user terminal camp on the target network, the user usually makes a second call. The call determining module determines whether the preset FR condition is met. If the second call request message is received before the preset FR condition is met, CSFB does not need to be performed because the user terminal is in the target network. In addition, the paging timeout caused by the extremely time-consuming CSFB does not exist. The user terminal can receive a call setup message. The user makes a selection on a call notification interface of the user terminal. The call module performs a call operation. If the second call request message is not received before the preset FR condition is met, the FR module performs FR to access the 4G network.

With reference to the first implementation of the first aspect of the present invention, in a second implementation of the first aspect of the present invention, the preset FR condition is a preset time period;

the call determining module is specifically configured to detect an idle access time since the user terminal accesses the target network, where the idle access time is a time period during which the user terminal does not make a call or receive a call; and the call determining module is specifically configured to: when the idle access time reaches the preset time period, determine that the preset FR condition is met; or the call determining module is specifically configured to: when the idle access time does not reach the preset time period, determine that the preset FR condition is not met.

After the user terminal accesses the target network and when the user terminal does not make a call or receive a call, the call determining module starts timing. When the second call request message is not received within the preset time period, the call determining module determines that the preset FR condition is met. When the idle access time does not reach the preset time period, that is, the second call request message is received within the preset time period, the call determining module determines that the preset FR condition is not met.

With reference to the first aspect of the present invention, in a third implementation of the first aspect of the present invention, the user terminal further includes:

an FR determining module and an FR module;

the FR determining module is configured to obtain an inter-RAT reselection instruction generated by a user operation, where the inter-RAT reselection instruction is an FR instruction or a hold instruction, the FR instruction is used to instruct the user terminal to access the 4G network, and the hold instruction is used to instruct the user terminal to camp on the target network;

the FR determining module is further configured to determine whether the inter-RAT reselection instruction is the FR instruction;

the FR module is configured to: when the inter-RAT reselection instruction is the FR instruction, perform FR to access the 4G network; and the execution module is further configured to: when the inter-RAT reselection instruction is not the FR instruction, camp on the target network.

After accessing the target network, the user terminal may further show the user an FR operation interface. The FR operation interface has two icons: one is corresponding to the FR instruction, and the other is corresponding to the hold instruction. If the icon selected by the user is corresponding to the FR instruction, the FR module performs an FR operation. If the icon selected by the user is corresponding to the hold instruction, the execution module makes the user terminal camp on the target network.

A third aspect of the present invention provides a user terminal, including:

a radio frequency RF circuit, configured to obtain a first call request message; and a processor, configured to perform CSFB according to the first call request message to access a target network; where the processor is further configured to determine whether a call setup message is received; and the processor is further configured to: when the call setup message is not received, camp on the target network.

When a user, as a calling party, needs to initiate a circuit switched service such as a call, the radio frequency RF circuit may receive the first call request message. Specifically, the user may initiate a call to a called party by using a dialing interface of the user terminal. Alternatively, when a user, as a called party, receives paging initiated by a calling party, the radio frequency RF circuit may receive a first call request message delivered by the calling party by using a 4G network.

If the user terminal is currently in the 4G network, because the 4G network does not have a circuit switched service, the processor needs to perform circuit switched fallback, that is, CSFB, according to the first call request message to access the target network that has the circuit switched service such as a 2G network or a 3G network, so as to perform the circuit switched service.

After accessing the target network by using the RF circuit, the user terminal may initiate a call to a peer. In addition, the user terminal further needs to monitor whether a call setup message is received. Specifically, by enabling a timer or in another manner, the user terminal may determine whether a call setup message is received within a preset time period. If no call setup message is received, it indicates that a current call fails. Usually, the user initiates a call again. To reduce a quantity of network handovers, the user terminal may continue to camp on the target network, so as to wait for the user to initiate a call again.

When the RF circuit obtains a second call request message, the user terminal has accessed the target network. Therefore, the user terminal does not need to perform a CSFB operation, so as to reduce time consumed in a CSFB process, and avoid a call error caused by a paging timeout, thereby increasing a call setup success rate.

With reference to the third aspect of the present invention, in a first implementation of the third aspect of the present invention, the processor is further configured to determine whether a preset fast return FR condition is met; and the processor is further configured to: when receiving a second call request message before the preset FR condition is met, perform a call operation in the target network; or the processor is further configured to: when not receiving the second call request message before the preset FR condition is met, perform FR to access a 4G network.

After the user terminal fails in the first call, and camps on the target network, the user usually makes a second call. The processor determines whether the preset FR condition is met. If the second call request message is received before the preset FR condition is met, CSFB does not need to be performed because the user terminal is in the target network. In addition, the paging timeout caused by the extremely time-consuming CSFB does not exist. The RF circuit may receive a call setup message. The user makes a selection on a call notification interface of the user terminal. The processor performs a call operation. If the processor does not receive the second call request message before the preset FR condition is met, the processor performs FR to access the 4G network.

With reference to the first implementation of the third aspect of the present invention, in a second implementation of the third aspect of the present invention, the preset FR condition is a preset time period;

the processor is further configured to detect an idle access time since the user terminal accesses the target network, where the idle access time is a time period during which the user terminal does not make a call or receive a call;

the processor is further configured to determine whether the idle access time reaches a preset time period; and the processor is further configured to: when the idle access time reaches the preset time period, determine that the preset FR condition is met; or the processor is further configured to: when the idle access time does not reach the preset time period, determine that the preset FR condition is not met.

After the user terminal accesses the target network and when the user terminal does not make a call or receive a call, the processor starts timing. When the RF circuit does not receive the second call request message within the preset time period, it indicates that the preset FR condition is met. When the idle access time does not reach the preset time period, that is, the RF circuit receives the second call request message within the preset time period, it indicates that the preset FR condition is not met.

With reference to the third aspect of the present invention, in a third implementation of the third aspect of the present invention, the processor is further configured to obtain an inter-RAT reselection instruction generated by a user operation, where the inter-RAT reselection instruction is an FR instruction or a hold instruction, the FR instruction is used to instruct the user terminal to access the 4G network, and the hold instruction is used to instruct the user terminal to camp on the target network;

the processor is further configured to determine whether the inter-RAT reselection instruction is the FR instruction; and the processor is further configured to: when the inter-RAT reselection instruction is the FR instruction, perform FR to access the 4G network; or the processor is further configured to: when the inter-RAT reselection instruction is not the FR instruction, camp on the target network.

After accessing the target network, the user terminal may further show the user an FR operation interface. The FR operation interface has two icons: one is corresponding to the FR instruction, and the other is corresponding to the hold instruction. If the icon selected by the user is corresponding to the FR instruction, the processor performs an FR operation. If the icon selected by the user is corresponding to the hold instruction, the processor makes the user terminal camp on the target network.

With reference to the third aspect of the present invention, the first implementation of the third aspect, the second implementation of the third aspect, or the third implementation of the third aspect, in a fourth implementation of the third aspect of the present invention, the processor is further configured to send a CSFB request to the 4G network according to the first call request by using the RF circuit, so that the 4G network delivers a target frequency channel number of the target network to the user terminal according to the CSFB request;

the RF circuit is specifically configured to receive the target frequency channel number; and the processor is further configured to access the target network according to the target frequency channel number.

The user terminal is currently in the 4G network, and the first call request obtained by the processor by using the RF circuit is a request for a circuit switched service. Therefore, the processor needs to perform CSFB to access the target network in which the circuit switched service can be performed. The processor sends the CSFB request to the 4G network. A network device of the 4G network may deliver the target frequency channel number of the target network to the user terminal according to the CSFB request. The processor receives, according to the RF circuit, the target frequency channel number delivered by the 4G network, disconnects from the 4G network, and accesses the target network. Elaboration of a CSFB process is for the following purpose: When needing to perform the circuit switched service, the user terminal disconnects from the 4G network in which the circuit switched service cannot be performed, so as to access the target network in which the circuit switched service can be performed.

With reference to the fourth implementation of the third aspect of the present invention, in a fifth implementation of the third aspect of the present invention, the processor is further configured to: obtain a location area of the target frequency channel number according to the target frequency channel number, and obtain a location area of the 4G network;

the processor is further configured to determine whether the location area of the target frequency channel number is the same as the location area of the 4G network; and the processor is further configured to: when the location area of the target frequency channel number is the same as the location area of the 4G network, detect a call setup message; or the processor is further configured to: when the location area of the target frequency channel number is not the same as the location area of the 4G network, perform a location area update LAU operation on the target frequency channel number.

After the user terminal accesses the target network according to the target frequency channel number, the processor further needs to determine whether the location area of the target frequency channel number is consistent with the location area of the 4G network when the user terminal is in the 4G network. Determining that the two location areas are consistent is to ensure that a call connection can be accurately implemented by using a network device of the location area. If the location area of the target frequency channel number is the same as the location area of the 4G network, the processor monitors whether the RF circuit receives a call setup message. If the location area of the target frequency channel number is not the same as the location area of the 4G network, the processor performs an LAU operation on the target frequency channel number, and updates the location area of the target frequency channel number to the location area of the 4G network. Performing the LAU operation is to successfully set up a call connection.

BRIEF DESCRIPTION OF DRAWINGS

To describe the technical solutions in the embodiments of the present invention more clearly, the following briefly describes the accompanying drawings required for describing the embodiments and the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

Embodiments of the present invention provide a method for keeping in a CSFB network and a user terminal, so that when a first call of a 4G user fails to be set up, the user terminal keeps in a target network accessed by means of CSFB. In this way, when the 4G user receives a call request message for the second time, the user terminal does not need to perform CSFB, thereby increasing a call setup success rate.

To make persons skilled in the art understand the technical solutions in the present invention better, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

In the present invention, user equipment is a terminal device that supports a 4G network, such as a mobile phone or a tablet computer. A user who uses the user terminal is a 4G user. The 4G network does not provide a circuit switched service. Therefore, when the user is dialing as a calling party or receives a paging message as a called party, that is, after the user terminal obtains a first call request message, the user terminal performs a CSFB operation, and falls back to a target network (a 2G network or a 3G network) from the 4G network, so as to perform the circuit switched service by using the target network. However, an existing CSFB process consumes too much time. This causes a paging timeout, a call cannot be set up, and the user terminal cannot receive a call setup message. In this case, the user terminal does not perform an FR operation, and camps on the target network. Usually, when a first call is not set up, the user makes a second attempt. When obtaining a second call request message, the user terminal has accessed the target network, and does not need to perform a CSFB operation. This can avoid a call setup failure caused by the extremely time-consuming CSFB process.

Figure 1:
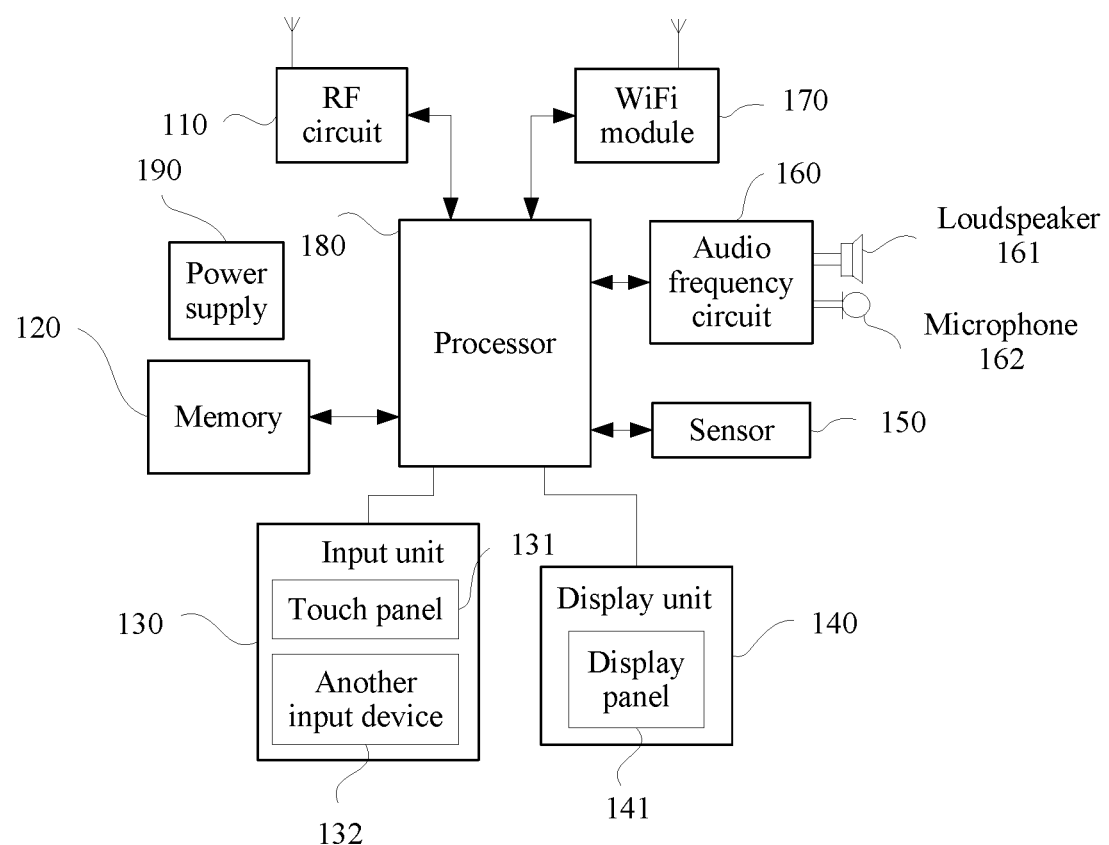
FIG. 1 is a schematic structural diagram of a physical apparatus of a user terminal according to an embodiment of the present invention.

An example in which the user terminal is a mobile phone is used. A block diagram of a partial structure of the mobile phone is shown in FIG. 1. The mobile phone includes components such as a radio frequency (Radio Frequency, RF) circuit 110, a memory 120, an input unit 130, a display unit 140, a sensor 150, an audio frequency circuit 160, a Wireless Fidelity (wireless fidelity, WiFi) module 170, a processor 180, and a power supply 190. Persons skilled in the art can understand that, the mobile phone structure shown in FIG. 1 does not constitute a limitation on the mobile phone, and the mobile phone may include more or fewer components than those shown in the figure, or may combine some components or have different component configurations.

All components of the mobile phone are described in detail with reference to FIG. 1.

The RF circuit 110 may be configured to receive and send information, or receive and send a signal during a call. Particularly, the RF circuit 110 receives downlink information from a base station, and sends the downlink information to the processor 180 for processing; and sends uplink data to the base station. Generally, the RF circuit 110 includes but is not limited to an antenna, at least one amplifier, a transceiver, a coupler, a low noise amplifier (Low Noise Amplifier, LNA), and a duplexer. In addition, the RF circuit 110 may further communicate with a network or another device by means of wireless communication. The foregoing wireless communication may use any communications standard or protocol, including but not limited to: Global System for Mobile Communications (Global System of Mobile communication, GSM), a general packet radio service (General Packet Radio Service, GPRS), Code Division Multiple Access (Code Division Multiple Access, CDMA), Wideband Code Division Multiple Access (Wideband Code Division Multiple Access, WCDMA), LTE, an email, and a short message service (Short Messaging Service, SMS).

The memory 120 may be configured to store a software program and a module. By running the software program and the module that are stored in the memory 120, the processor 180 performs various function applications and data processing of the mobile phone. The memory 120 may mainly include a program storage area and a data storage area. The program storage area may store an operating system, an application program required by at least one function (such as a sound playing function and an image playing function), and the like, and the data storage area may store data (such as audio data and an address book) created according to use of the mobile phone, and the like. In addition, the memory 120 may include a high-speed random access memory, and may further include a nonvolatile memory, such as at least one magnetic disk storage component, a flash memory component, or another volatile solid-state storage component.

The input unit 130 may be configured to receive entered numeral or character information, and generate key signal input related to user setting and function control of the mobile phone. Specifically, the input unit 130 may include a touch panel 131 and another input device 132. The touch panel 131, also referred to as a touchscreen, may collect a touch operation performed by a user on or near the touch panel 131 (for example, an operation performed by the user on the touch panel 131 or near the touch panel 131 by using any suitable object or accessory such as a finger or a stylus), and drive a corresponding connection apparatus according to a preset program. Optionally, the touch panel 131 may include two parts: a touch detection apparatus and a touch controller. The touch detection apparatus detects a touch orientation of a user, detects a signal brought by the touch operation, and sends the signal to the touch controller. The touch controller receives touch information from the touch detection apparatus, converts the touch information into touch point coordinates, sends the touch point coordinates to the processor 180, and can receive and execute a command sent by the processor 180. In addition, the touch panel 131 may be implemented by using multiple types, such as a resistive type, a capacitive type, an infrared ray, and a surface acoustic wave. In addition to the touch panel 131, the input unit 130 may include the another input device 132. Specifically, the another input device 132 may include but is not limited to one or more of a physical keyboard, a function key (such as a volume control key or an on/off key), a trackball, a mouse, a joystick, or the like.

The display unit 140 may be configured to display information entered by the user or information provided for the user, and various menus of the mobile phone. The display unit 140 may include a display panel 141. Optionally, the display panel 141 may be configured by using a liquid crystal display (Liquid Crystal Display, LCD), an organic light-emitting diode (Organic Light-Emitting Diode, OLED), or the like. Further, the touch panel 131 may cover the display panel 141. After detecting a touch operation on or near the touch panel 131, the touch panel 131 transfers the touch operation to the processor 180 to determine a type of a touch event. Then the processor 180 provides corresponding visual output on the display panel 141 according to the type of the touch event. In FIG. 1, the touch panel 131 and the display panel 141 are used as two independent components to implement input and input functions of the mobile phone. However, in some embodiments, the touch panel 131 and the display panel 141 may be integrated to implement the input and output functions of the mobile phone.

The mobile phone may further include at least one sensor 150, such as a light sensor, a motion sensor, or another sensor. Specifically, the light sensor may include an ambient light sensor and a proximity sensor. The ambient light sensor may adjust luminance of the display panel 141 according to brightness of ambient light, and the proximity sensor may turn off the display panel 141 and/or backlight when the mobile phone approaches an ear of the user. As a motion sensor, an accelerometer sensor can detect values of acceleration in all directions (usually, there are three axes), may detect a value and a direction of gravity in a static state, and can be used for an application that identifies a mobile phone posture (such as switching between landscape and portrait, a related game, or magnetometer posture calibration), a function related to vibration identification (such as a pedometer or a strike), and the like. For another sensor, such as a gyroscope, a barometer, a hygrometer, a thermometer, or an infrared sensor, that can be further disposed on the mobile phone, details are not described herein.

The audio frequency circuit 160, a loudspeaker 161, and a microphone 162 may provide an audio interface between the user and the mobile phone. The audio frequency circuit 160 may transmit, to the loudspeaker 161, an electrical signal converted from received audio data, and the loudspeaker 161 converts the electrical signal into a sound signal for output. In addition, the microphone 162 converts a collected sound signal into an electrical signal, the audio frequency circuit 160 converts the electrical signal into audio data upon receipt of the electrical signal and outputs the audio data to the processor 180 for processing, and then the audio data is sent to, for example, another mobile phone, by using the RF circuit 110, or the audio data is output to the memory 120 for further processing.

WiFi belongs to a short-distance wireless transmission technology. The mobile phone may help, by using the WiFi module 170, the user receive and send an email, browse a web page, access streaming media, and the like. The WiFi module 170 provides wireless broadband Internet access for the user. Although the WiFi module 170 is shown in FIG. 1, it should be understood that the WiFi module 170 is not a mandatory component of the mobile phone, and may be omitted as required without changing a scope of the essence of the present invention.

The processor 180 is a control center of the mobile phone, and uses various interfaces and lines to connect all parts of the entire mobile phone. By running or executing the software program and/or the module that are/is stored in the memory 120 and invoking data stored in the memory 120, the processor 180 executes various functions and data processing of the mobile phone, so as to perform overall monitoring on the mobile phone. Optionally, the processor 180 may include one or more processing units. Preferably, the processor 180 may integrate an application processor and a modem processor. The application processor mainly processes an operating system, a user interface, an application program, and the like; and the modem processor mainly processes wireless communication. It may be understood that the foregoing modem processor may be not integrated into the processor 180.

The mobile phone further includes the power supply 190 (such as a battery) that supplies power to each component. Preferably, the power supply may be logically connected to the processor 180 by using a power management system, so as to implement functions such as management of charging, discharging, and power consumption by using the power supply management system.

Although not shown, the mobile phone may further include a camera, a Bluetooth module, and the like, and details are not described herein.

A method for keeping in a CSFB network is described in detail below by using an embodiment.

Figure 2:
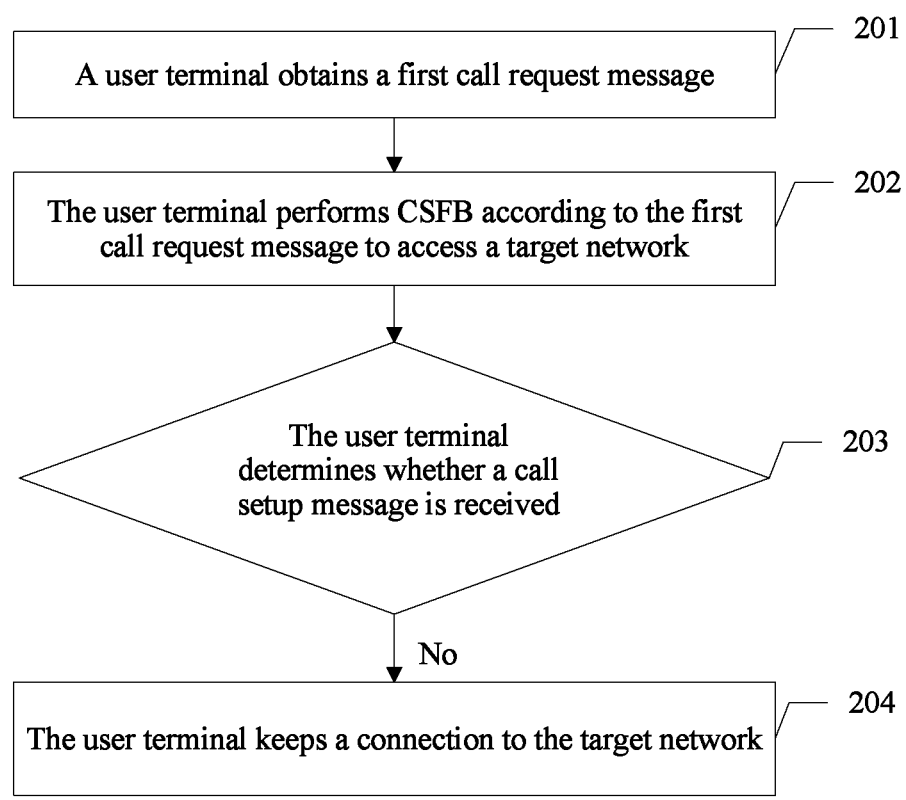
FIG. 2 is a schematic diagram of a method for keeping in a CSFB network according to an embodiment of the present invention.

Referring to FIG. 2, an embodiment of the present invention provides a method for keeping in a CSFB network, including the following steps.

201. A user terminal obtains a first call request message.

In this embodiment, the user terminal is a device that supports a 4G network such as a mobile phone or a tablet computer. A user who uses the user terminal is a 4G user. When the user makes a voice call as a calling party, the first call request message is a voice call message. When the user receives a paging message delivered by the 4G network as a called party, the first call request message is the paging message. When the user makes the voice call as the calling party or receives the paging message delivered by the 4G network as the called party, the user terminal obtains the first call request message.

202. The user terminal performs CSFB according to the first call request message to access a target network.

In this embodiment, the user terminal determines to perform a circuit switched service according to the obtained first call request message. However, the user terminal currently accesses the 4G network, and the 4G network cannot perform the circuit switched service. Therefore, the user terminal needs to be disconnected from the 4G network and access the target network (a 2G network or a 3G network). In this way, the user terminal sends a CSFB request to a network device of the 4G network. The network device delivers a CSFB response to the user terminal according to the CSFB request, so that the user terminal completes a CSFB operation, and accesses the target network from the 4G network.

203. The user terminal determines whether a call setup message is received, and if no call setup message is received, performs step 204.

In this embodiment, after successfully accessing the target network, the user terminal can perform the circuit switched service. The target network performs processing according to the first call request message. If a pre-call link of the calling party and the called party is established, a call setup message is sent to the calling party and the called party. However, an existing case is that a CSFB process is time-consuming, and the network device does not establish the pre-call link in time. Therefore, the call setup message cannot be generated. When obtaining the first call request message, the user terminal needs to monitor whether the call setup message is received. Specifically, the user terminal may enable a timer, or determine in another manner whether the call setup message is received within a preset time period. If no call setup message is received, perform step 204.

204. The user terminal camps on the target network.

In this embodiment, when the user terminal does not receive the call setup message delivered by the target network, it indicates that the call or the paging fails. The user terminal is not to perform an FR operation, and camps on the target network.

In this embodiment of the present invention, after obtaining the first call request message, and performing the CSFB operation, the user terminal fails to receive the call setup message. The user terminal camps on the target network, that is, does not perform FR to access the 4G network. Usually, the user makes a call again. In this case, the user terminal has accessed the target network. Therefore, the user terminal does not need to perform the CSFB operation, so as to reduce time consumed in a CSFB process, and avoid a call error caused by a paging timeout, thereby increasing a call setup success rate.

Figure 3:
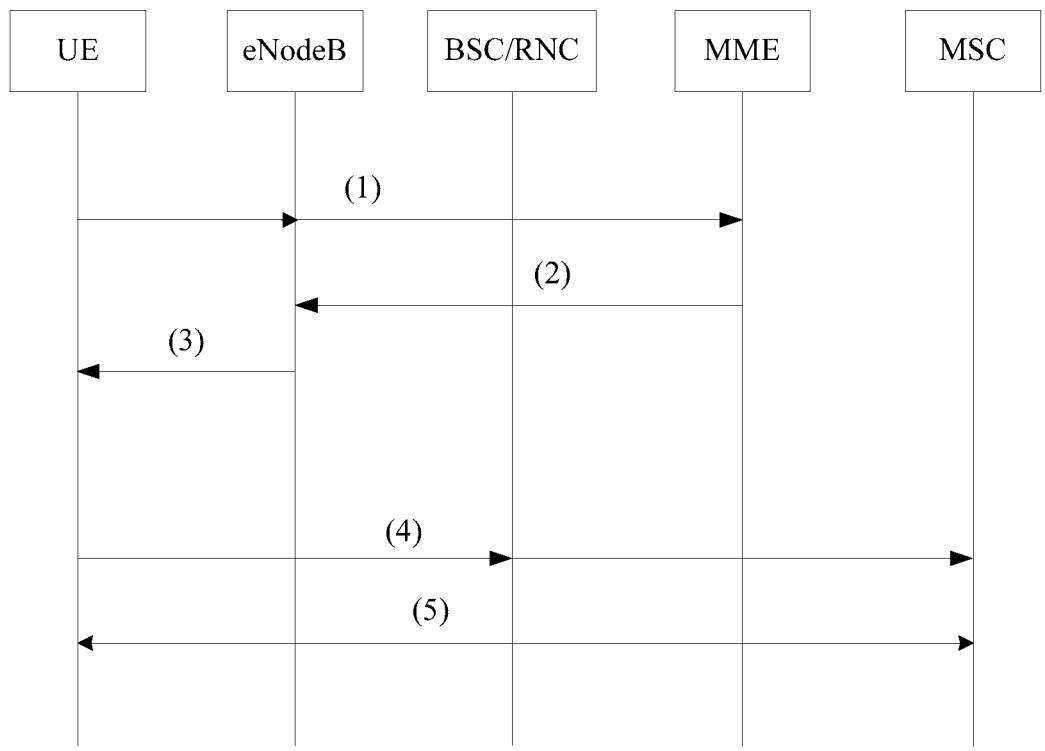
FIG. 3 is a schematic signaling flowchart of CSFB and an LUA when a user is a calling party according to an embodiment of the present invention.

Optionally, in some embodiments of the present invention, when a user is a calling party, a signaling flowchart of CSFB and an LAU is shown in FIG. 3.

(1) If a user terminal UE determines, according to a first call request message, that the user initiates a voice service, the UE sends an extended service request (Extended Service Request) message to a network node (Mobility Management Entity, MME). The extended service request message carries a CSFB request. A service-type information element is used to indicate that a service type is an originating CSFB voice service. In addition, the extended service request message carries a temporary mobile subscriber identity (Temporary Mobile Subscriber Identity, TMSI) allocated to the UE in a circuit switched (Circuit Switched, CS) domain in a combined attach procedure.

(2) The MME sends an Initial Context Setup Request message to an eNodeB. The Initial Context Setup Request message includes CSFB information. The CSFB information is used to indicate the eNodeB. The UE needs to fall back to a UTRAN (UMTS Terrestrial Radio Access Network) or a GERAN (GSM EDGE Radio Access Network) due to the CSFB voice service.

(3) The eNodeB sends specific wireless configuration information of a target network to the UE, and releases a 4G network connection to the UE. If the eNodeB uses a redirection technique, the eNodeB requires the UE to measure a current location area of the 4G network, and obtains a measurement report reported by the UE, so as to determine a target frequency channel number of the target network and a location area of the target frequency channel number.

(4) The UE searches for the target frequency channel number of the target network according to the wireless configuration information. The UE accesses the target network according to the target frequency channel number, and initiates a call manager service request (CM Service Request) message of the CS domain. If the CM service request message carries a CSMO flag, a mobile switching center (Mobile Switching Center, MSC) records that a current call is an originating CSFB call of the UE.

(5) The UE obtains the location area of the target frequency channel number according to the target frequency channel number, obtains a recorded location area of the 4G network, and determines whether the location area of the target frequency channel number is the same as the location area of the 4G network. If the location area of the target frequency channel number is the same as the location area of the 4G network, the UE detects a call setup message. If the location area of the target frequency channel number is not the same as the location area of the 4G network, the UE performs an LAU operation on the target frequency channel number. If the redirection technique is used in (3), this step does not need to be performed.

Figure 4:
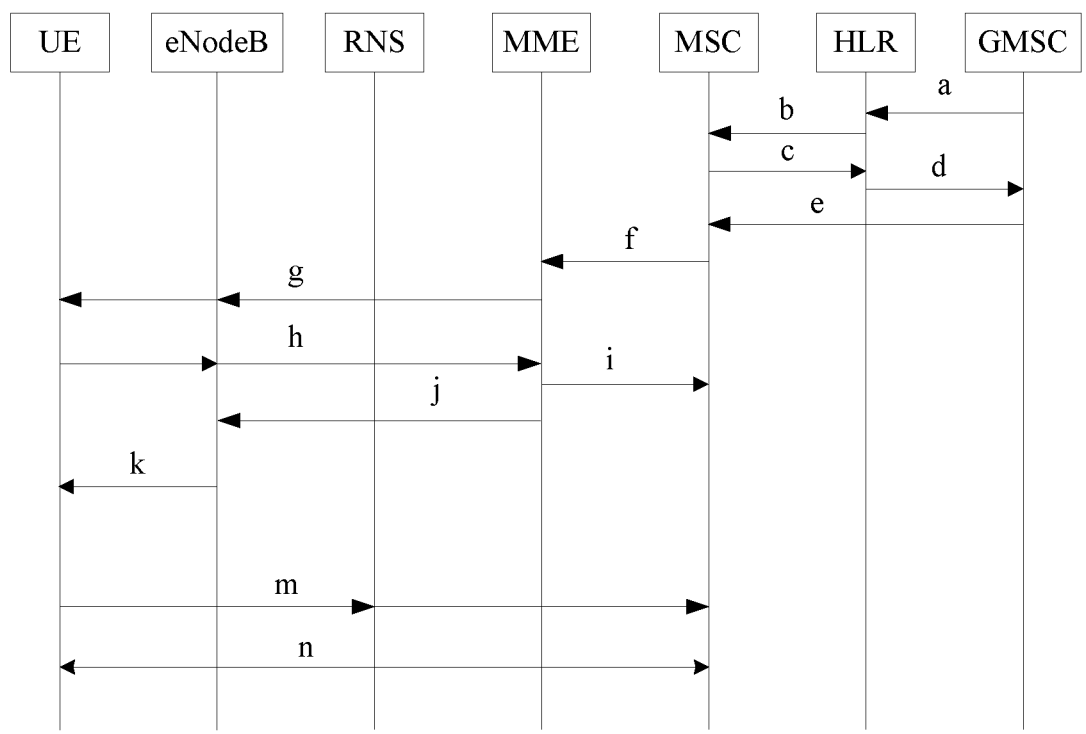
FIG. 4 is a schematic signaling flowchart of CSFB and an LUA when a user is a called party according to an embodiment of the present invention.

When a user is a called party, a signaling flowchart of CSFB and an LAU is shown in FIG. 4.

a. A gateway mobile switching center (Gateway Mobile Switching Center, GMSC) sends a route lookup request to a home location register HLR of the called user.

b. After receiving the route lookup request, the HLR obtains a roaming number from an original MSC to which the called user is currently attached.

c. The original MSC allocates the roaming number for the call, and returns the roaming number to the HLR.

d. The HLR sends the roaming number to the GMSC.

e. After receiving the roaming number, the GMSC analyzes the roaming number, sends an Identity and Access Management (Identity and Access Management, IAM) incoming message to the original MSC according to an analysis result, and routes the call to a new MSC.

f. After receiving the IAM incoming message, the new MSC sends an SGsAP-PAGING-REQUEST message to an MME according to existing SGs interface association information and MME information.

g. The MME sends a first call request message (that is, a paging message) to an eNodeB, and the eNodeB initiates an air-interface paging process to UE.

h. The UE sends an Extended Service Request message to the MME according to the first call request message. The extended service request message carries a CSFB request. A service-type information element is used to indicate that a service type is an originating CSFB voice service, and carries a temporary mobile subscriber identity (Temporary Mobile Subscriber Identity, TMSI) allocated to the UE in a circuit switched (Circuit Switched, CS) domain in a combined attach procedure.

i. The MME sends an SGsAP-SERVICE-REQUEST message to the new MSC, so that the new MSC no longer resends the paging message to the MME. To avoid a case that a calling party waits an extremely long time in a call connection process, when receiving an SGs Service Request message that includes an idle-state indication, the new MSC first notifies the calling party that this call is in a connection process.

j. The MME sends an Initial UE Context Setup message to the eNodeB. The Initial UE Context Setup message includes CSFB information. The CSFB information is used to indicate the eNodeB that the UE needs to fall back to a UTRAN (UMTS Terrestrial Radio Access Network) or a GERAN (GSM EDGE Radio Access Network) due to the CSFB voice service.

k. The eNodeB sends specific wireless configuration information of a target network to the UE, and releases a 4G network connection to the UE. If the eNodeB uses a redirection technique, the eNodeB requires the UE to measure a current location area of the 4G network, and obtains a measurement report reported by the UE, so as to determine a target frequency channel number of a redirected target network and a location area of the target frequency channel number.

m. The UE searches for the target frequency channel number of the target network according to the wireless configuration information. The UE accesses the target network according to the target frequency channel number.

n. The UE obtains the location area of the target frequency channel number according to the target frequency channel number, obtains the recorded location area of the 4G network, and determines whether the location area of the target frequency channel number is the same as the location area of the 4G network. If the location area of the target frequency channel number is the same as the location area of the 4G network, the UE detects a call setup message. If the location area of the target frequency channel number is not the same as the location area of the 4G network, the UE performs an LAU operation on the target frequency channel number. If the redirection technique is used in (k), this step does not need to be performed.

In the prior art, after CSFB is successful, because CSFB usually consumes 5 s to 10 s, a paging process consumes too much time. Therefore, this call setup fails, and the user terminal cannot receive the call setup message delivered by the target network. When detecting no call setup message, the user terminal camps on the target network.

Optionally, in some embodiments of the present invention, after the user terminal camps on the target network, the following steps are further included:

The user terminal determines whether a preset FR condition is met.

If the user terminal receives a second call request message before meeting the preset FR condition, the user terminal performs a call operation in the target network.

Alternatively, if the user terminal does not receive a second call request message before meeting the preset FR condition, the user terminal performs FR to access the 4G network.

When the preset FR condition is a preset time period, the user terminal determines, in the following specific manner, whether the preset FR condition is met:

The user terminal detects an idle access time since the user terminal accesses the target network, where the idle access time is a time period during which the user terminal does not make a call or receive a call.

The user terminal determines whether the idle access time reaches the preset time period.

If the idle access time reaches the preset time period, the preset FR condition is met.

Alternatively, if the idle access time does not reach the preset time period, the preset FR condition is not met.

After the user terminal fails in the first call, and camps on the target network, a user usually makes a second call. A time period since the user terminal accesses the target network and does not make a call or receive a call is the idle access time. When the idle access time exceeds the preset time period, the preset FR condition is met. That is, when not receiving the second call request message before meeting the preset FR condition, the user terminal performs FR to access the 4G network. When the idle access time does not exceed the preset time period, the preset FR condition is not met. This may also be understood as that, when not receiving the second call request message before meeting the preset FR condition, the user terminal does not need to perform an FR operation, that is, camps on the target network. The user terminal is in the target network, and does not need to perform CSFB. Therefore, a paging timeout caused by extremely time-consuming CSFB does not exist. The user terminal can receive a call setup message. The user selects to answer a call on a call notification interface of the user terminal, and the user terminal performs a call operation.

Optionally, in some embodiments of the present invention, after the user terminal camps on the target network, the following steps are further included:

The user terminal obtains an inter-RAT reselection instruction generated by a user operation, where the inter-RAT reselection instruction is an FR instruction or a hold instruction, the FR instruction is used to instruct the user terminal to access a 4G network, and the hold instruction is used to instruct the user terminal to camp on the target network.

The user terminal determines whether the inter-RAT reselection instruction is the FR instruction.

If the inter-RAT reselection instruction is the FR instruction, the user terminal performs FR to access the 4G network.

Alternatively, if the inter-RAT reselection instruction is not the FR instruction, the user terminal camps on the target network.

The user terminal shows the user an inter-RAT reselection interface. The inter-RAT reselection interface has operation buttons corresponding to two inter-RAT reselection instructions. The two inter-RAT reselection instructions are an FR instruction and a hold instruction. The FR instruction is used to instruct the user terminal to access the 4G network. The hold instruction is used to instruct the user terminal to camp on the target network. If the inter-RAT reselection instruction obtained by the user terminal is an FR instruction, the user terminal reaches the preset FR condition, and needs to perform an FR operation. If the inter-RAT reselection instruction obtained by the user terminal is a hold instruction, the user terminal does not reach the preset FR condition, and does not need to perform an FR operation. If the user does not make a selection on the inter-RAT reselection interface, it is considered by default that the user terminal does not reach the preset FR condition, and automatically exits the inter-RAT reselection interface. The user terminal shows the user the inter-RAT reselection interface again after a period of time, and prompts the user to make a selection.

Figure 5:
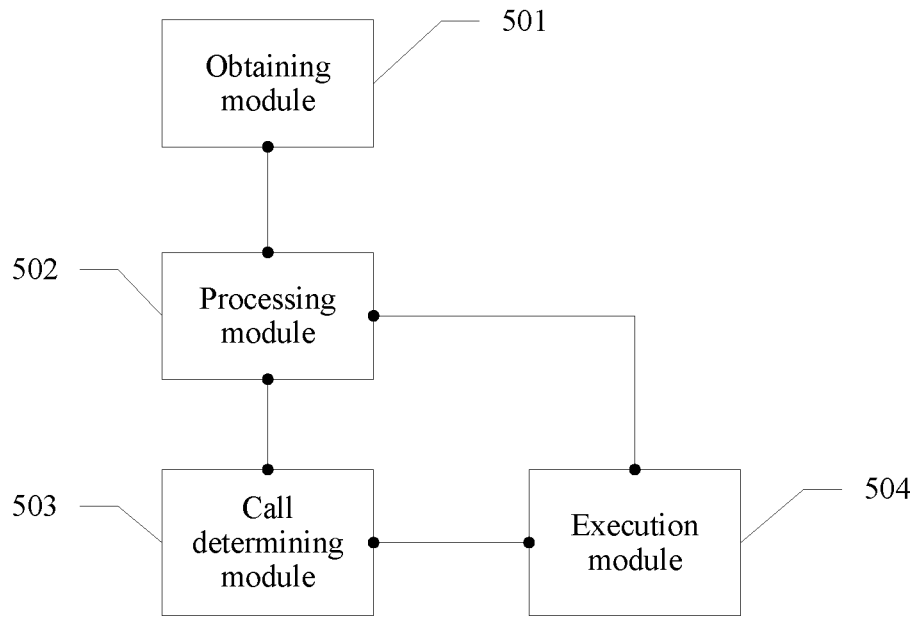
FIG. 5 is a schematic structural diagram of a user terminal according to an embodiment of the present invention.

Referring to FIG. 5, an embodiment of the present invention provides a user terminal, configured to implement the foregoing method for keeping in a CSFB network shown in FIG. 2. The user terminal includes: an obtaining module 501, a processing module 502, a call determining module 503, and an execution module 504.

The obtaining module 501 is configured to obtain a first call request message.

For specific content, refer to a description of step 201.

The processing module 502 is configured to perform CSFB according to the first call request message obtained by the obtaining module 501, to access a target network.

For specific content, refer to a description of step 202.

The call determining module 503 is configured to determine whether a call setup message is received.

For specific content, refer to a description of step 203.

The execution module 504 is configured to: when the call determining module 503 determines that the call setup message is not received, camp on the target network.

For specific content, refer to a description of step 204.

In this embodiment of the present invention, the obtaining module 501 obtains the first call request message. The processing module 402 accesses the target network from a 4G network by means of CSFB. When the call determining module 503 determines that a first call is not set up, the execution module 504 camps on the target network, that is, does not perform FR to access the 4G network. If the obtaining module 501 obtains the first call request message for the second time, the processing module 502 has accessed the target network. Therefore, the processing module 502 does not need to perform a CSFB operation, so as to avoid a paging timeout caused by an extremely time-consuming CSFB process, thereby increasing a call setup success rate.

Optionally, in some embodiments of the present invention, the processing module 502 is specifically configured to send a CSFB request to the 4G network according to the first call request, so that the 4G network delivers a target frequency channel number of the target network to the user terminal according to the CSFB request.

For specific content, refer to descriptions of signaling flow steps (2), (3), h, i, j, and k.

The processing module 502 is specifically configured to receive the target frequency channel number.

For specific content, refer to descriptions of signaling flow step (4) and step m.

The processing module 502 is specifically configured to access the target network according to the target frequency channel number.

For specific content, refer to descriptions of signaling flow step (4) and step m.

Figure 6:
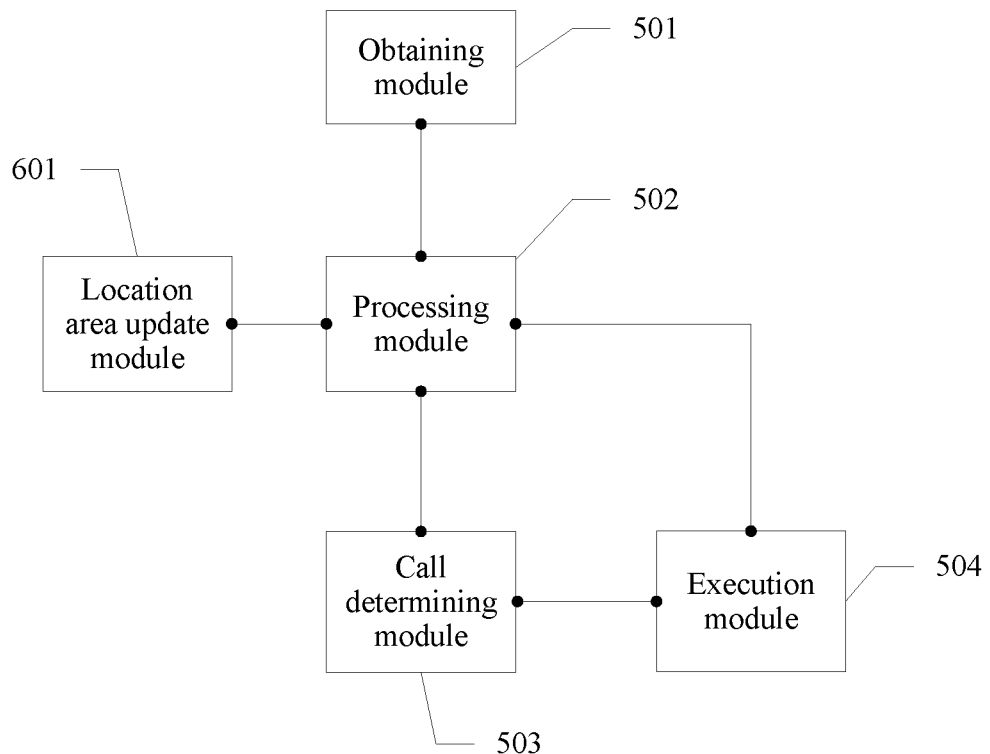
FIG. 6 is a schematic structural diagram of another a user terminal according to an embodiment of the present invention.

Optionally, as shown in FIG. 6, in some embodiments of the present invention, the user terminal further includes: a location area update module 601.

The location area update module 601 is configured to: obtain a location area of the target frequency channel number according to the target frequency channel number, and obtain a location area of the 4G network.

The location area update module 601 is further configured to determine whether the location area of the target frequency channel number is the same as the location area of the 4G network.

The call determining module 503 is further configured to: when the location area of the target frequency channel number is the same as the location area of the 4G network, detect a call setup message.

The location area update module 601 is further configured to: when the location area of the target frequency channel number is not the same as the location area of the 4G network, perform a location area update LAU operation on the target frequency channel number.

For specific content, refer to descriptions of signaling flow step (5) and step n.

Figure 7:
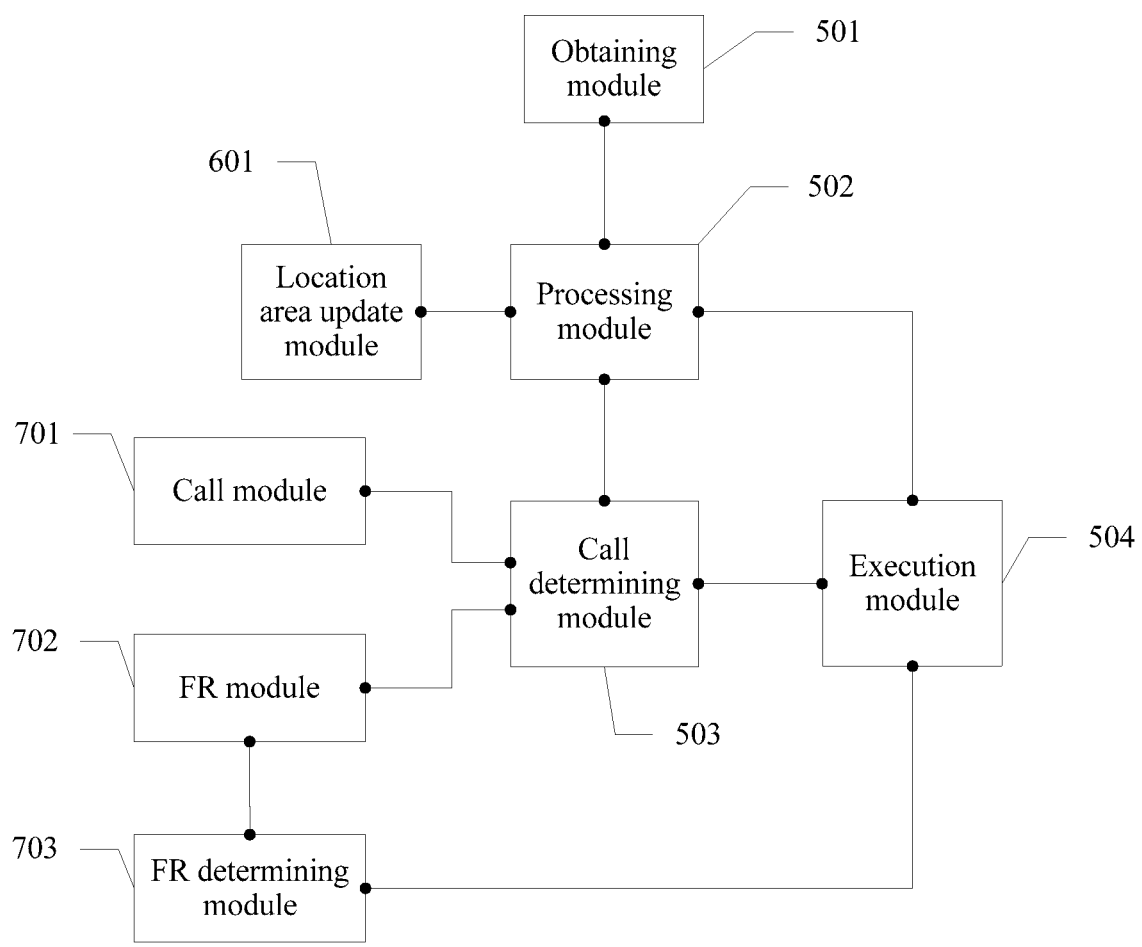
FIG. 7 is a schematic structural diagram of still another a user terminal according to an embodiment of the present invention.

Optionally, as shown in FIG. 7, in some embodiments of the present invention, the user terminal further includes: a call module 701 and an FR module 702.

The call determining module 503 is further configured to determine whether a preset FR condition is met.

The call module 701 is configured to: when a second call request message is received before the preset FR condition is met, perform a call operation in the target network.

The FR module 702 is configured to: when the second call request message is not received before the preset FR condition is met, perform FR to access the 4G network.

Optionally, in some embodiments of the present invention, the preset FR condition is a preset time period.

The call determining module 503 is specifically configured to detect an idle access time since the user terminal accesses the target network, where the idle access time is a time period during which the user terminal does not make a call or receive a call.

The call determining module 503 is specifically configured to: when the idle access time reaches the preset time period, determine that the preset FR condition is met.

The call determining module 503 is specifically configured to: when the idle access time does not reach the preset time period, determine that the preset FR condition is not met.

Optionally, as shown in FIG. 7, in some embodiments of the present invention, the user terminal further includes: an FR determining module and an FR module 702.

The FR determining module 703 is configured to obtain an inter-RAT reselection instruction generated by a user operation, where the inter-RAT reselection instruction is an FR instruction or a hold instruction, the FR instruction is used to instruct the user terminal to access the 4G network, and the hold instruction is used to instruct the user terminal to camp on the target network.

The FR determining module 703 is further configured to determine whether the inter-RAT reselection instruction is the FR instruction.

The FR module 702 is configured to: when the inter-RAT reselection instruction is the FR instruction, perform FR to access the 4G network.

The execution module 504 is further configured to: when the inter-RAT reselection instruction is not the FR instruction, camp on the target network.

The foregoing describes an embodiment of a modular structure of a user terminal. The following describes a physical apparatus by using an example in which the user terminal is a mobile phone.

Referring to FIG. 1, an embodiment of the present invention provides a user terminal, including: an RF circuit 110 and a processor 180.

The RF circuit 110 is configured to obtain a first call request message.

For specific content, refer to a description of step 201.

The processor 180 is configured to perform CSFB according to the first call request message to access a target network.

For specific content, refer to a description of step 202.

The processor 180 is further configured to determine whether a call setup message is received.

For specific content, refer to a description of step 203.

The processor 180 is further configured to: when the call setup message is not received, camp on the target network.

For specific content, refer to a description of step 204.

In this embodiment of the present invention, after the RF circuit 110 obtains the first call request message, and the processor 180 performs a CSFB operation, the RF circuit 110 receives no call setup message. The processor 180 makes the user terminal camp on the target network, that is, does not perform FR to access a 4G network. Usually, a user makes a call again. In this case, the user terminal has accessed the target network. Therefore, the user terminal does not need to perform a CSFB operation, so as to reduce time consumed in a CSFB process, and avoid a call error caused by a paging timeout, thereby increasing a call setup success rate.

Optionally, in some embodiments of the present invention, the processor 180 is further configured to determine whether a preset fast return FR condition is met.

The processor 180 is further configured to: when receiving a second call request message before the preset FR condition is met, perform a call operation in the target network.

The processor 180 is further configured to: when not receiving the second call request message before the preset FR condition is met, perform FR to access the 4G network.

Optionally, in some embodiments of the present invention, the processor 180 is further configured to detect an idle access time since the user terminal accesses the target network, where the idle access time is a time period during which the user terminal does not make a call or receive a call.

The processor 180 is further configured to determine whether the idle access time reaches a preset time period.

The processor 180 is further configured to: when the idle access time reaches the preset time period, determine that the preset FR condition is met.

The processor 180 is further configured to: when the idle access time does not reach the preset time period, determine that the preset FR condition is not met.

Optionally, in some embodiments of the present invention, the processor 180 is further configured to obtain an inter-RAT reselection instruction generated by a user operation, where the inter-RAT reselection instruction is an FR instruction or a hold instruction, the FR instruction is used to instruct the user terminal to access the 4G network, and the hold instruction is used to instruct the user terminal to camp on the target network.

The processor 180 is further configured to determine whether the inter-RAT reselection instruction is the FR instruction.

The processor 180 is further configured to: when the inter-RAT reselection instruction is the FR instruction, perform FR to access the 4G network.

The processor 180 is further configured to: when the inter-RAT reselection instruction is not the FR instruction, camp on the target network.

Optionally, in some embodiments of the present invention, the processor 180 is further configured to send a CSFB request to the 4G network according to the first call request by using the RF circuit, so that the 4G network delivers a target frequency channel number of the target network to the user terminal according to the CSFB request.

The RF circuit 110 is specifically configured to receive the target frequency channel number.

The processor 180 is further configured to access the target network according to the target frequency channel number.

Optionally, in some embodiments of the present invention, the processor 180 is further configured to send a CSFB request to the 4G network according to the first call request by using the RF circuit, so that the 4G network delivers a target frequency channel number of the target network to the user terminal according to the CSFB request.

For specific content, refer to descriptions of signaling flow steps (2), (3), h, i, j, and k.

The RF circuit 110 is specifically configured to receive the target frequency channel number.

For specific content, refer to descriptions of signaling flow step (4) and step m.

The processor 180 is further configured to access the target network according to the target frequency channel number.

For specific content, refer to descriptions of signaling flow step (4) and step m.

Optionally, in some embodiments of the present invention, the processor 180 is further configured to: obtain a location area of the target frequency channel number according to the target frequency channel number, and obtain a location area of the 4G network.

The processor 180 is further configured to determine whether the location area of the target frequency channel number is the same as the location area of the 4G network.

The processor 180 is further configured to: when the location area of the target frequency channel number is the same as the location area of the 4G network, detect a call setup message.

The processor 180 is further configured to: when the location area of the target frequency channel number is not the same as the location area of the 4G network, perform a location area update LAU operation on the target frequency channel number.

For specific content, refer to descriptions of signaling flow step (5) and step n.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present invention, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method, comprising:
    obtaining, by a user terminal, a first call request message;
    sending, by the user terminal, a circuit switched fallback (CSFB) request to a 4G network according to the first call request;
    receiving, by the user terminal and from the 4G network, a target frequency channel number of the target network according to the CSFB request; and
    accessing, by the user terminal, the target network according to the target frequency channel number
    after accessing the target network, obtaining, by the user terminal, a location area of the target frequency channel number according to the target frequency channel number;
    determining, by the user terminal, whether the location area of the target frequency channel number is the same as a location area of the 4G network;
    detecting, by the user terminal, a call setup message if the location area of the target frequency channel number is the same as the location area of the 4G network;
    performing, by the user terminal, a location area update (LAU) operation on the target frequency channel number if the location area of the target frequency channel number is not the same as the location area of the 4G network;
    determining, by the user terminal, whether the call setup message is received; and
    in response to determining that no call setup message is received, camping, by the user terminal, on the target network.

2. The method according to claim 1, wherein after the camping, by the user terminal, on the target network, the method further comprises:
    determining, by the user terminal, whether a preset fast return (FR) condition is met; and
    performing, by the user terminal, a call operation in the target network if the user terminal receives a second call request message before meeting the preset FR condition; and
    performing, by the user terminal, FR to access a 4G network if the user terminal does not receive a second call request message before meeting the preset FR condition.

3. The method according to claim 2, wherein the preset FR condition is a preset time period; and
    wherein the determining, by the user terminal, whether a preset FR condition is met comprises:
        detecting, by the user terminal, an idle access time since the user terminal accesses the target network, wherein the idle access time is a time period during which the user terminal does not make a call or receive a call; and
        determining, by the user terminal, whether the idle access time reaches the preset time period, wherein the preset FR condition is met if the idle access time reaches the preset time period, and wherein the preset FR condition is not met if the idle access time does not reach the preset time period.

4. The method according to claim 1, wherein after the camping, by the user terminal, on the target network, the method further comprises:

obtaining, by the user terminal, an inter-RAT reselection instruction generated by a user operation, wherein the inter-RAT reselection instruction is an FR instruction or a hold instruction, wherein the FR instruction is used to instruct the user terminal to access a 4G network, and wherein the hold instruction is used to instruct the user terminal to camp on the target network;

determining, by the user terminal, whether the inter-RAT reselection instruction is the FR instruction; and if the inter-RAT reselection instruction is the FR instruction, performing, by the user terminal, FR to access the 4G network; and if the inter-RAT reselection instruction is not the FR instruction, camping, by the user terminal, on the target network.

5. A user terminal, comprising:

a radio frequency (RF) circuit, the RF circuit configured to obtain a first call request message; and at least one processor, the at least one processor configured to send a CSFB request to a 4G network according to the first call request by using the RF circuit, wherein the 4G network delivers a target frequency channel number of the target network to the user terminal according to the CSFB request;

the RF circuit is configured to receive the target frequency channel number;

the at least one processor is further configured to:

access the target network according to the target frequency channel number;

obtain a location area of the target frequency channel number according to the target frequency channel number;

obtain a location area of the 4G network;

determine whether the location area of the target frequency channel number is the same as the location area of the 4G network;

detect a call setup message when the location area of the target frequency channel number is the same as the location area of the 4G network; and perform a location area update (LAU) operation on the target frequency channel number when the location area of the target frequency channel number is not the same as the location area of the 4G network;

determine whether the call setup message is received; and when the call setup message is not received, camp on the target network.

6. The user terminal according to claim 5, wherein the at least one processor is further configured to:

determine whether a preset fast return (FR) condition is met;

perform a call operation in the target network when receiving a second call request message before the preset FR condition is met; and perform FR to access a 4G network when not receiving the second call request message before the preset FR condition is met.

7. The user terminal according to claim 6, wherein the preset FR condition is a preset time period; and the at least one processor is further configured to:

detect an idle access time since the user terminal accesses the target network, wherein the idle access time is a time period during which the user terminal does not make a call or receive a call;

determine whether the idle access time reaches the preset time period; and determine that the preset FR condition is met when the idle access time reaches the preset time period; or determine that the preset FR condition is not met when the idle access time does not reach the preset time period.

8. The user terminal according to claim 5, wherein the at least one processor is further configured to:

obtain an inter-RAT reselection instruction generated by a user operation, wherein the inter-RAT reselection instruction is an FR instruction or a hold instruction, wherein the FR instruction is used to instruct the user terminal to access a 4G network, and wherein the hold instruction is used to instruct the user terminal to camp on the target network;

determine whether the inter-RAT reselection instruction is the FR instruction;

perform FR to access the 4G network when the inter-RAT reselection instruction is the FR instruction; and camp on the target network when the inter-RAT reselection instruction is not the FR instruction.

* * * * *